Oct. 8, 1957  M. W. IVES  2,808,742
DRILL BIT DRESSING TOOL
Filed Aug. 6, 1953  4 Sheets-Sheet 1
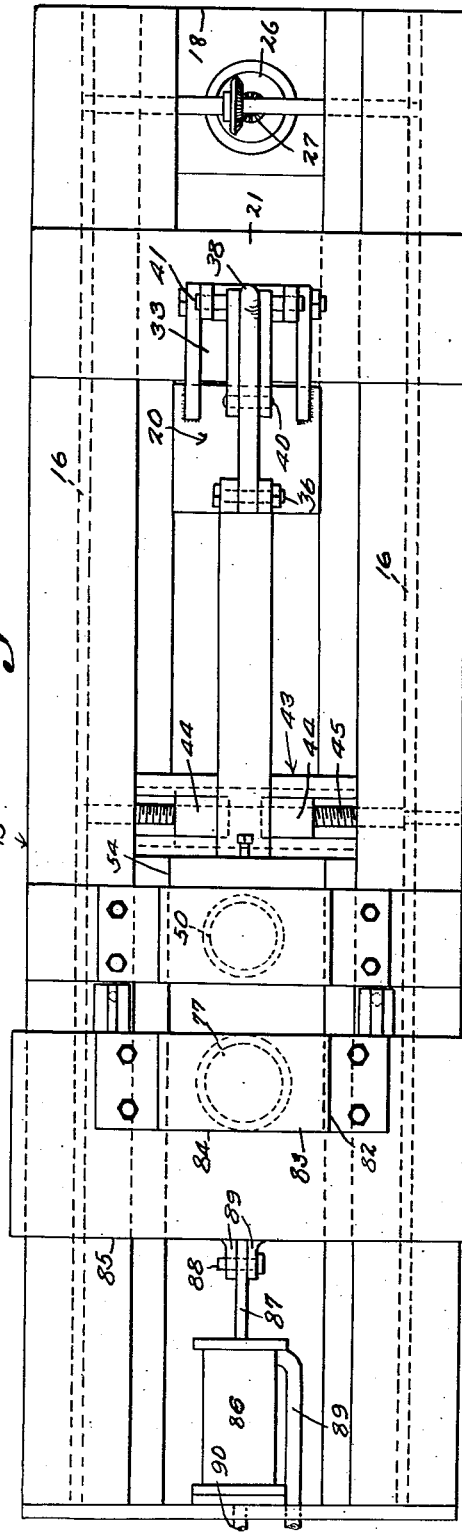
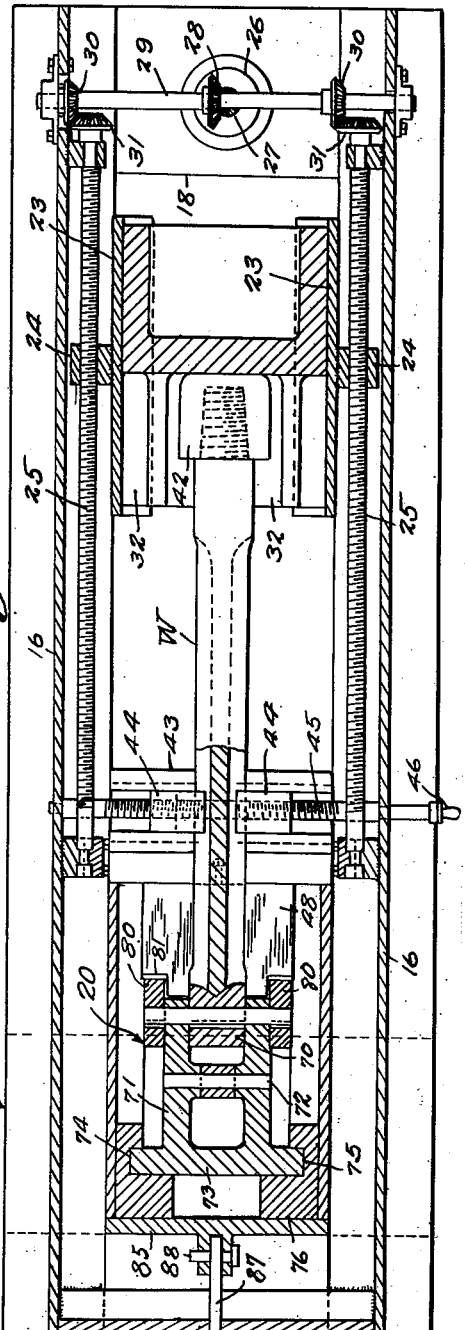
M. W. Ives
INVENTOR
BY
ATTORNEYS.

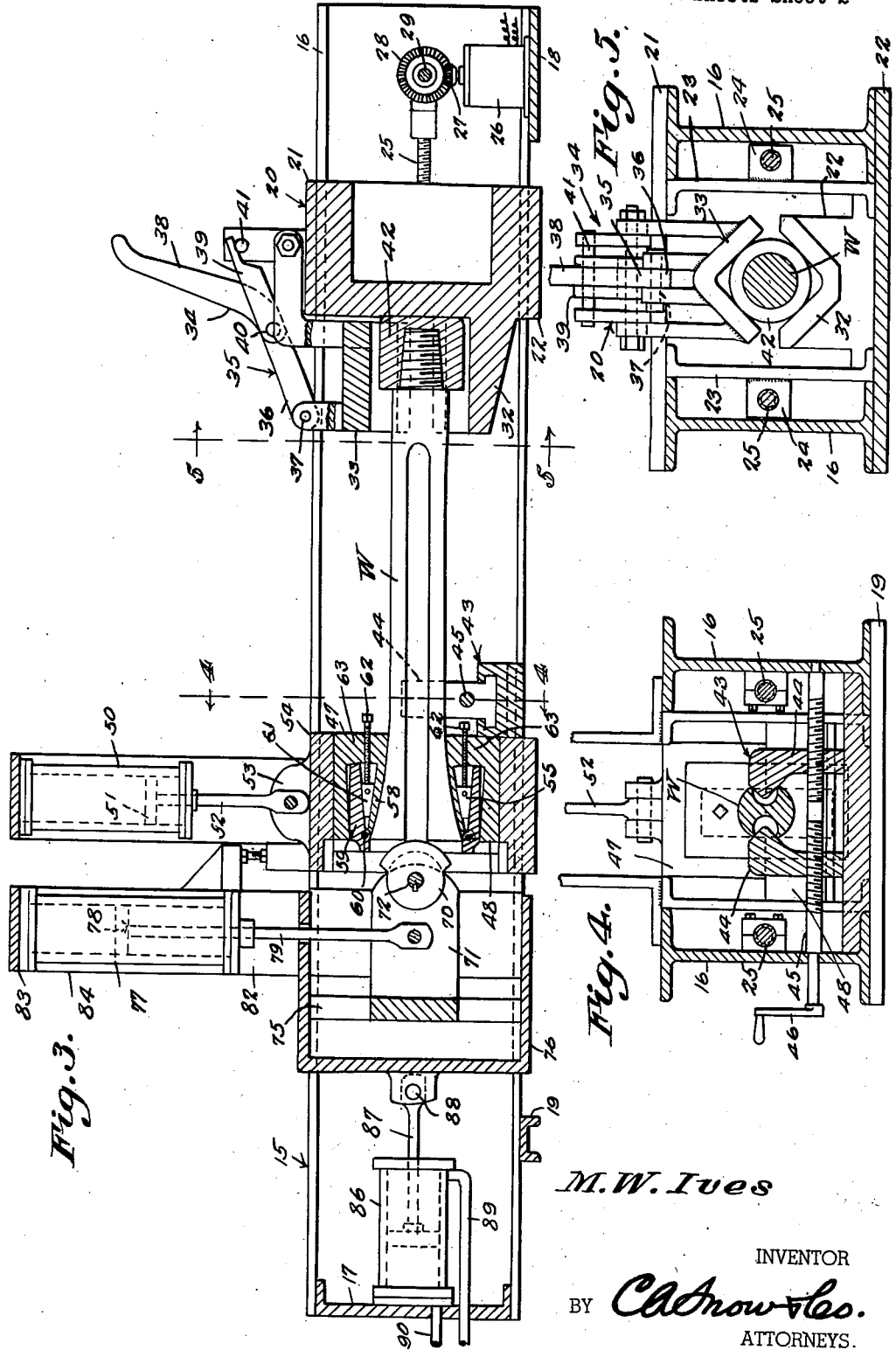

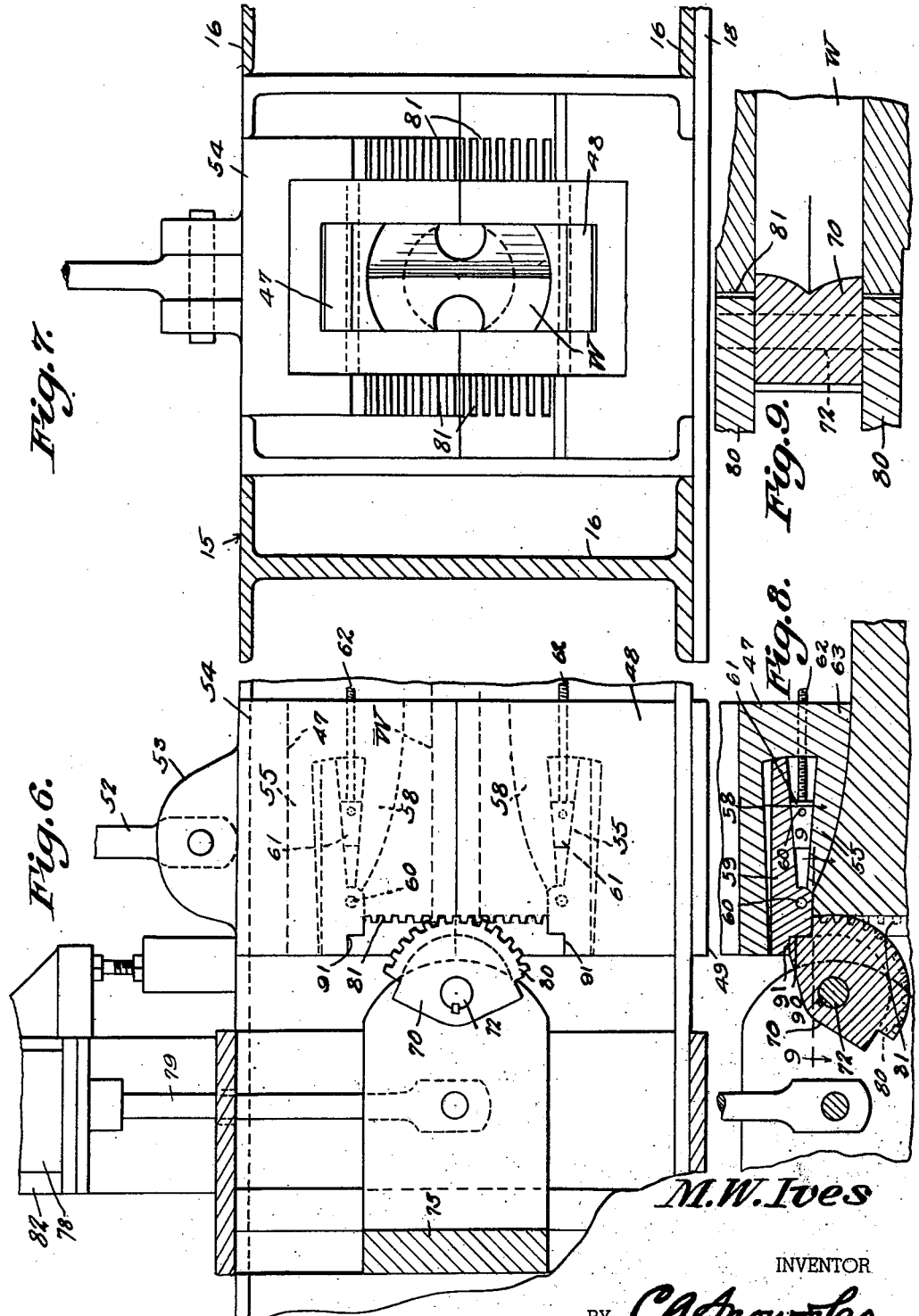

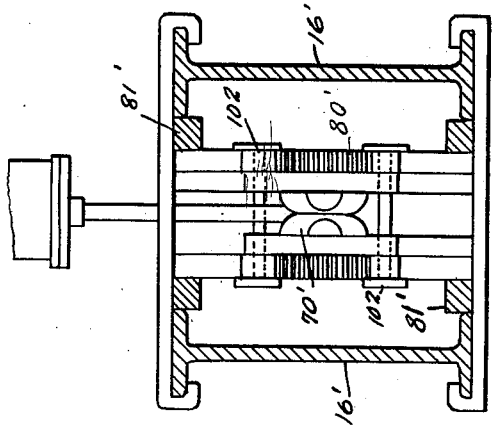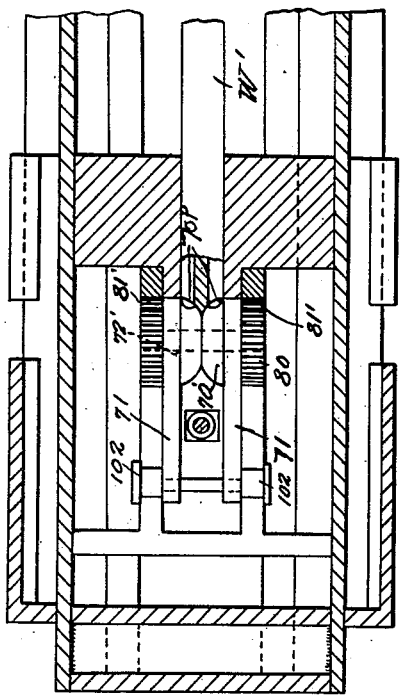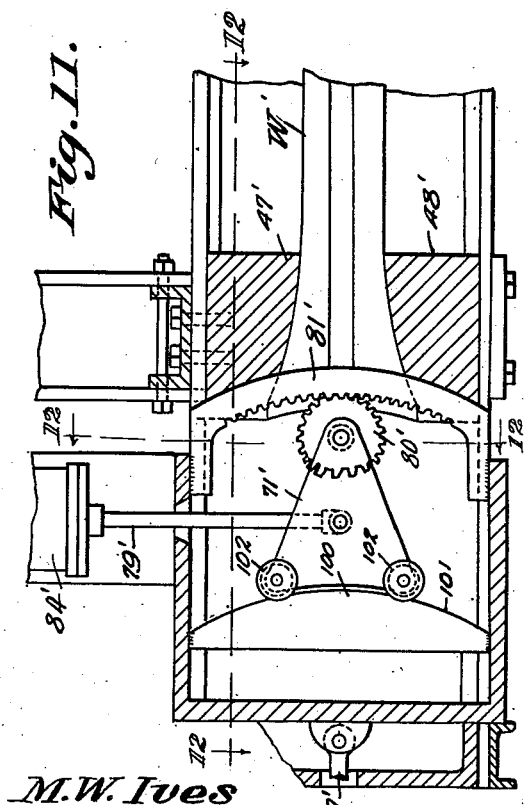

United States Patent Office 2,808,742
Patented Oct. 8, 1957

2,808,742

DRILL BIT DRESSING TOOL

Milo W. Ives, Haverstraw, N. Y., assignor, by direct and mesne assignments, of fifty percent to Milo Warren Ives, Mount Ivy, forty-nine percent to Irving G. Kennedy, Stony Point, and one percent to Alton W. Teale, Suffern, N. Y.

Application August 6, 1953, Serial No. 372,771

5 Claims. (Cl. 76—5)

This invention relates to a device for dressing and reconditioning cuting tools and more partciularly to a drill bit dressing and reconditioning device.

It is an object of this invention to provide power means for dressing tool bits for bits of well drilling or other stone cutting operations wherein the bit is of a generally large size as to its length, which may be in the neighborhood of about six feet or more, and in diameter which may be six inches, although it is to be understood that the size of the bit is such as to be unsuitable for hand operation for sharpening or reconditioning as required.

The drill bit dressing device of this invention is found as an improvement over my prior patent for a Semi-Automatic Rotary Cable Tool Dresser, Number 2,615,353, issued October 28, 1952, and my pending application Serial No. 336,697, filed February 13, 1953, which issued as Patent No. 2,771,796, November 27, 1956.

It is a further object of this invention to provide a power means for securing a drill bit while it is being worked upon and a power means for dressing the working cutter or drill bit in engagement with the work.

It is a still further object of this invention to provide power means for dressing the cutting edges of the drill bit both on a drill bit having straight line edges and on drill bits having arcuate cutting edges.

It is still a further object of this invention to provide an oscillating or rotatable rotary forming die or partially rotary forming die to sharpen the cutting edges of a drilling bit when and as such operation is required. The use of the drilling bit requires it to be frequently resharpened or redressed to maintian manual sharpening edges, and the size and formation of the bit, also requires that the bit be heated to a high temperature which also precludes manual handling during the sharpening process. Because the bit may be heated to become white hot, manual handling is necessarily eliminated, since besides being cut to have a proper edge on the tool, the cutting process may, and frequently does, require reshaping of the cutting edges of the tool. Also, because of the size of the bit, and the frequency of resharpening the bit, a device is maintained which may be properly manipulated and still be a size which can be easily handled at a low cost compared to manually handling the bit for resharpening.

Other and further objects and advantages of the invention will be hereinafter described and the novel features thereof defined in the following specification.

Fig. 1 is a top plan view of the apparatus with the bit, to be sharpened, removed.

Fig. 2 is a longitudinal section of the apparatus, partly broken away, and partly in section, with the tool to be sharpened supported in place.

Fig. 3 is a partial plan view, partly broken away, and partly in section showing the tool to be sharpened, clamped in place for the sharpening operation.

Fig. 4 is a transverse section taken on the line 4—4 of Fig. 3.

Fig. 5 is a transverse section taken on the line 5—5 of Fig. 3.

Fig. 6 is an enlarged detailed view of the sharpener operating means, the sharpener being removed.

Fig. 7 is an enlarged transverse view, partly broken away, showing the clamping means for the tool to be sharpened clamped in position at, the clamp being shown at one end of the tool, and substantially transversely of Fig. 6.

Fig. 8 is a fragmentary transverse view of the clamping means, showing the wedging means in the clamp.

Fig. 9 is a fragmentary, detailed, transverse section taken on the line 9—9 of Fig. 8.

Fig. 10 is a top plan view, partly broken away and partly in section of a modified form of this invention wherein the sharpening means is moved along an arcuate line, rather than a straight line as shown in Figs. 1 to 9.

Fig. 11 is a top plan view, partly broken away and partly in section of Fig. 10.

Fig. 12 is a fragmentary, enlarged, detailed view taken on the line 12—12 of Fig. 11.

Referring to the drawings in detail, the entire apparatus is adapted to be supported on I beams or guide beams 16 for movement along the support 15 as required by the operation. The I beams 16 are secured together in spaced apart relation adjacent one end thereof by a flat plate 18 and adjacent the other end thereof by a channel shaped member 19 to rigidly secure the beam members in selected position. The plate 18 and the channel member 19 may be secured to the beams 16 by welding, bolts, or any other suitable fastening means. A clamp 20 is supported by the I beams 16 for sliding movement along the length thereof. The clamping member 20 is shown adjacent one end of the framework for supporting one end of a tool W to be worked upon. The clamp 20 comprises an upper plate 21 and a lower plate 22 being secured together by upstanding, spaced apart connecting members 23.

The upper and lower members 21 and 22 are adapted to slide longitudinally along and between the beams 16 and members 21 and 22 to engage the facing upper and lower surfaces of the beams 16. A nut member 24 is fixed on the outer side of each of the connecting members 23 for moving the clamping member along the length of the beams 16. The nuts 24 are internally threaded and an elongated screw 25 is threadedly engaged in each of the nuts 24. The screws 25 extend longitudinally of the frame defined by the beams and are rotated by power means supported at one end of the frame. The power means includes an electric motor 26 having a rotatable beveled gear 27 at one end thereof. A beveled gear 28 is carried by a shaft 29 extending transversely of the frame and engages with the power driven beveled gear 27 for rotating the shaft 29 and gears 30 are fixed adjacent the opposite ends of the shaft 29 for rotating gears 31 carried by one end of each of the screws 25 so that operation of the motor 26 will rotate both of the screw threaded members 25 to thereby move the clamping member 20 longitudinally of the frame. The motor 26 may be rotated in two directions by suitable means, either electric or hydraulic, such as a switch or valve not shown in the drawings. In this way the clamping means 20 may be moved in a selected direction along the length of the frame.

The clamp 20 further includes a pair of clamping members, or jaws, for engaging, in clamping relation one end of the work piece. One of the clamping members, as the jaw 32, is fixed to the sliding portion of the clamping member 20, the co-related clamping jaw 33 is supported above the clamping jaw 32 for vertical movement to clamp or release the work piece W when and as desired, The movable clamping member 33 is moved in its relation to the clamping member 20 by a toggle link 34 which is provided with one arm 35 pivotally connected at one end, as the end 36, to the member 33 by a pivot pin 37 and an upwardly extending arm 38 which may be used as a handle. A link 39 is pivotally connected at one end to the end of the arm 35 adjacent its connection to the handle 38 by a transverse pin 40 and the other end of the link 39 is free for engagement with a stop pin 41 carried by and spaced above the clamping member 20. One end of the work piece W may be inserted between the clamping jaws 32 and 33 by any suitable and adjustable jack means, between the work W and the clamping members 32 and 33 and this end of the work piece W is provided with a cushioning nut member 42, threaded on the work W, to protect the work piece against damage at one end at the time that the work piece is being inserted into the clamp.

The other end of the work piece W at which end the sharpening or dressing is to be accomplished is supported in a clamping member 43 formed by a pair of jaws 44 which are slidably supported on the channel forming members 23 for movement transversely of the frame 15 into engagement with the opposite sides of the flutes of the work piece W. A shaft 45 is formed with right and left hand threads along the length thereof and one portion of the threaded shaft 45 being threaded in a direction opposite from the other so that rotation of the shaft 45, engaging through a related threaded opening in the jaw members 44 will effect the drawing together of the jaw members in their related sections, or flutes of the work piece W and rotation of the shaft in the opposite direction will effect the spreading apart of the jaw members 44 for removal of the work piece or for insertion of another work piece to be worked upon. As most drills, of the kind to be worked upon by this device are provided with longitudinally extending fluted sections, the ends of the clamping members, or jaws 44 are formed for engaging in the fluted sections of the work piece W.

Adjacent to the clamping jaws 44 are a pair of clamping die carrying members 47 and 48 which are power operated for clamping the work piece in its position to be worked upon by the cutting element adjacent to the clamping members. One of the die carrying members, as the member 48 is adapted to bear against the inside of the clamping member, or support which encircles the frame member and is disposed at one side of one of the guide beams 16 and the other die carrying member 47 is carried for sliding movement on the other side of the work piece W, the two die members being adjustable toward each other on the opposite sides of the work piece.

A piston 51 is slidable in the cylinder 50 and is provided with a piston rod 52 secured at one end to the piston 51 at the other end to an upstanding arm 53 which in turn is secured to the die holding carrier 54. Each of the die carrying members 47 and 48 includes a shoe member 55 for engagement with the edge of the end of the work piece W to be worked upon, each of the die members 47 and 48 is hollow along the length thereof having one side in engagement with the work piece and another side 59 pivoted by way of a pivot pin 60 to the fixed member 58 and extending in a direction opposite to the work piece or bit W. A wedge 61 is slidable between the fixed and movable sections of the die members and the wedge 61 is moved to its desired position by a screw 62 engaging through the rear wall 63 of the die carrying members. The wedges and their related screws are provided for securely fastening the dies in their relation to the work piece W after the work piece has been placed within the die clamping members. When the work piece W has been clamped within the clamping members prior to engagement of the work with the cutting edges thereof, fluid under pressure is admitted to the cylinder 50 at one side of the piston 51 for pressing the clamping members into engagement with the work piece or bit, W, and to the other side of the piston for releasing the clamp from the work piece. The fluid pressure means may be of any conventional type as a valve or valves, not shown in the drawings, separate from the cylinder 50 and piston 51.

With the bit clamped in proper position, the tool reconditioning and dressing member 70 is moved up into position in dressing engagement with the work piece W. The purpose of the dressing member 70 is to shear away the excess metal which projects over the face of the dies which is usually cut away by means of a hand chisel. The member 70 is pivotally mounted in a frame 71 by a pivot pin 72, the frame 71 including a back wall 73 which is slidably supported in grooves 74 in the side walls 75 of a carrier 76. For moving the cutting member and carrier 76 transversely of the frame, a piston is forced transversely of the frame by fluid pressure exerted at one end of the cylinder 77 within which the piston 78 is engaged. A piston rod 79 is fixed at one end to the piston 78 and at the other end to the carrier for the dressing member 70. The dressing element or sharpener is generally semi-circular, as shown in Fig. 3 of the drawings and has a depression in its periphery, as shown in Fig. 2 of the drawings. The cutting edge of the tool to be worked upon is inserted into the depression of the dressing member 70, as shown in Fig. 2 and the dressing element will be rotated about its pivot pin 72 by virtue of its frictional engagement with the edge of the die and because of the fixed connection of the segment gears 80 fixed on the pivot pin or shaft 72, the segmental gears 80 being enmeshed with the gears of the rack 81 referring to Figures 6, 7 and 8. The teeth of the rack 81 are fixed in their relation to the gears 80 by being fixed to and extending from one edge of the adjacent clamping member within which the bit W is supported. When the dressing member 70 has travelled to the edges of the cutting edge or face of the bit the excess metal will be sheared away from the die and the dressing bit will be stopped in its rotation by the end teeth of the gear engaging the end of the rack. Each of the drill bits are provided with longitudinally extending grooves or water courses on the shank, terminating at the cutting edges of the bit. In one form of the invention, as shown in Fig. 10 of the drawings, plugs 70P are formed on the dressing member 70 for removing metal which may work into the water course of the bit. When the dressing member 70′ is synchronized by the gear section 80 and gear rack 81 and the dressing member 70′ is in center position the plugs, or water course cleaners, will move into the water course of the bit.

The cylinder 77 within which the piston 78 is operated is supported by the arms 82 and bight 83 of the supporting member 84 which is clamped onto the side of a carriage 85.

A piston 86 is connected to the carriage 85 by a piston rod 87 being pivotally connected by means of a pivot pin 88 engaging through a pair of parallel outwardly extending arms 89 for moving the carriage 85 and the cutting element 70 longitudinally of the frame. A pair of pressure lines 89 and 90 are connected to the opposite ends of the cylinder 86, and a valve means, not shown in the drawings, may be provided for moving the cutting or forming means 70 in the direction desired longitudinally of the apparatus 15 on the beams 16.

The operation of the drill bit dressing tool invention is accomplished by clamping a tool to be sharpened between the clamping members 32 and 33 and the clamping members 44 in their desired position. Pressure may be exerted through cylinder 50 for further clamping the work by way of the dies within the dressing device and then by the application of suitable hydraulic pressure to the cylinder 86 for moving the dressing member 70 up into dressing engagement with the cutting edges of the work piece W. Application of pressure into the cylinder 77 will move the bit 70 transversely of the supporting means and in engagement with the work piece W for sharpening or otherwise dressing the cutting edges of the work piece.

The dressing element 70 will be rotated about its pivot pin 72 because of the engagement between the segmental gear section 80 and gear rack 81, also fixed on the pivot pin 72 and any excess material from the bit W will be sheared off by the engagement of the shoulders at the end of the segment gear 80 within related pockets 91 on the die members and at the end of the rack 81. This operation accomplishes the sharpening and dressing of the cutting edges of the work piece W in a straight line manner where the cutting edges of the work piece W are in a straight line as shown in Figs. 1 to 9 inclusive in the drawings.

A modified form of this invention is shown in Figs. 10, 11 and 12 for pressing the forward cutting edges of the tool or bit, W' having arcuate cutting edges. A guide plate 100 having an arcuate guide surface 101 is welded, or otherwise fixedly secured in the longitudinally movable carriage for the cutting member 70'. The arcuate guide surface 101 conforms to the arcuate cutting edge of the drill bit W' to be sharpened. An arcuate rack 81' is also fixed to the side walls of the longitudinally extending walls of the carrier and spaced from the guide member 101. A triangular bracket 71', corresponding to the bracket 71' is positioned between the track 81' and the guide member 100. The dressing tool 70' is pivotally carried at one end of the triangular bracket 71' and a pair of transversely spaced apart rollers 102 are carried by the two other corners for engaging the arcuate surface 101 of the guide member 100 so that as the piston rod 79' is extended from the piston 84' the dressing member will move along a path conforming to the arcuate surface of the drill bit W' being sharpened.

The operation of the modified form of this invention is primarily the same and the operation of the dressing device described before being moved transversely of the frame by the cylinder 84' and piston rod 79' and moved longitudinally of the frame by the piston rod 87'.

While the specific details have been herein shown and described, the invention is not confined thereto as changes and alterations may be made without departing from the spirit thereof and defined by the appended claims.

I claim:

1. A drill bit dressing tool of the kind described comprising a supporting frame, drill bit supporting means including a fixed jaw and a movable jaw slidable on said frame, said movable jaw being movably supported on said fixed jaw, clamping means for said bits slidable on said frame adjacent to the cutting edges of said drill bit, said clamping means comprising a fixed die member, a movable die member cooperating with said fixed die member adjacent to the cutting edge of said drill bit, fluid pressure means on said movable clamping member for pressing said die member into clamping engagement with said drill bit and said fixed die member, a rotatable cutting edge dressing member engageable with the cutting edge of the drill bit to be dressed, and means on said cutting edge dressing member for shearing away excess metal projecting over the face of said dies during the tool dressing operation, said means comprising shoulders formed on the periphery of said edge dressing member.

2. A drill bit dressing tool of the kind described comprising a supporting frame, drill bit supporting means including a fixed jaw and a movable jaw slidable on said frame, said movable jaw being movably supported on said fixed jaw, clamping means for said bit movable on said frame, said clamping means comprising a fixed die member, a movable die member cooperating with said fixed die member, fluid pressure means carried by said movable clamping members adapted to press said die member into clamping engagement with the drill bit and said fixed die member, cutting edge dressing means slidably supported on said frame adapted to be moved longitudinally of said frame and transversely of said frame in dressing engagement with the cutting edges of the drill bit to be dressed, said tool including a supporting bracket slidable transversely of said frame, cutting edge dressing means rotatably carried by said bracket adapted to engage the edge of the bit to be dressed, hydraulic means for moving said bracket transversely of said frame, and means pressing said cutting edge dressing means movable longitudinally of said frame into bit edge dressing position.

3. A drill bit dressing tool of the kind described comprising a supporting frame, a drill bit supporting means including a fixed jaw slidable longitudinally of said frame and a movable jaw member cooperating with said fixed jaw member, said movable jaw member being movably supported on said fixed jaw member, a toggle link connection between said movable jaw member and said frame, power operated engaging nut and screws for moving said jaw members, a stationary clamping die engageable with the drill bit to be dressed adjacent the cutting edge thereof, a movable clamping die engaging with said stationary clamping die, power means for moving said dies into bit clamping engagement, and dressing means adapted to dress the cutting edges of the drill bit.

4. A drill bit dressing tool as set forth in claim 3 wherein said clamping dies include a hollow body having a side wall, a movable wall in said body adapted to engage the bit to be dressed, and an adjustable wedge positioned between said side wall securing said clamping dies in bit engaging position.

5. A drill bit as set forth in claim 4 wherein said cutting edge dressing means comprises a rotatable cutting edge dressing member adapted to engage the cutting edge to be dressed, an arcuate gear member fixed relative to said dressing member, a gear rack meshing with the gear member, and a carriage slidable longitudinally of said frame, and means for actuating said carriage.

References Cited in the file of this patent

UNITED STATES PATENTS

| | | |
|---|---|---|
| 552,843 | Larson | Jan. 7, 1896 |
| 752,026 | Bryson | Feb. 16, 1904 |
| 1,395,702 | Ditson | Nov. 1, 1921 |
| 2,404,201 | Wineman | July 16, 1946 |
| 2,615,353 | Ives | Oct. 28, 1952 |